Feb. 27, 1962 G. C. HUGHES 3,023,093
FLUID PRESSURE DISTRIBUTING SYSTEM
Original Filed March 25, 1954 3 Sheets-Sheet 2

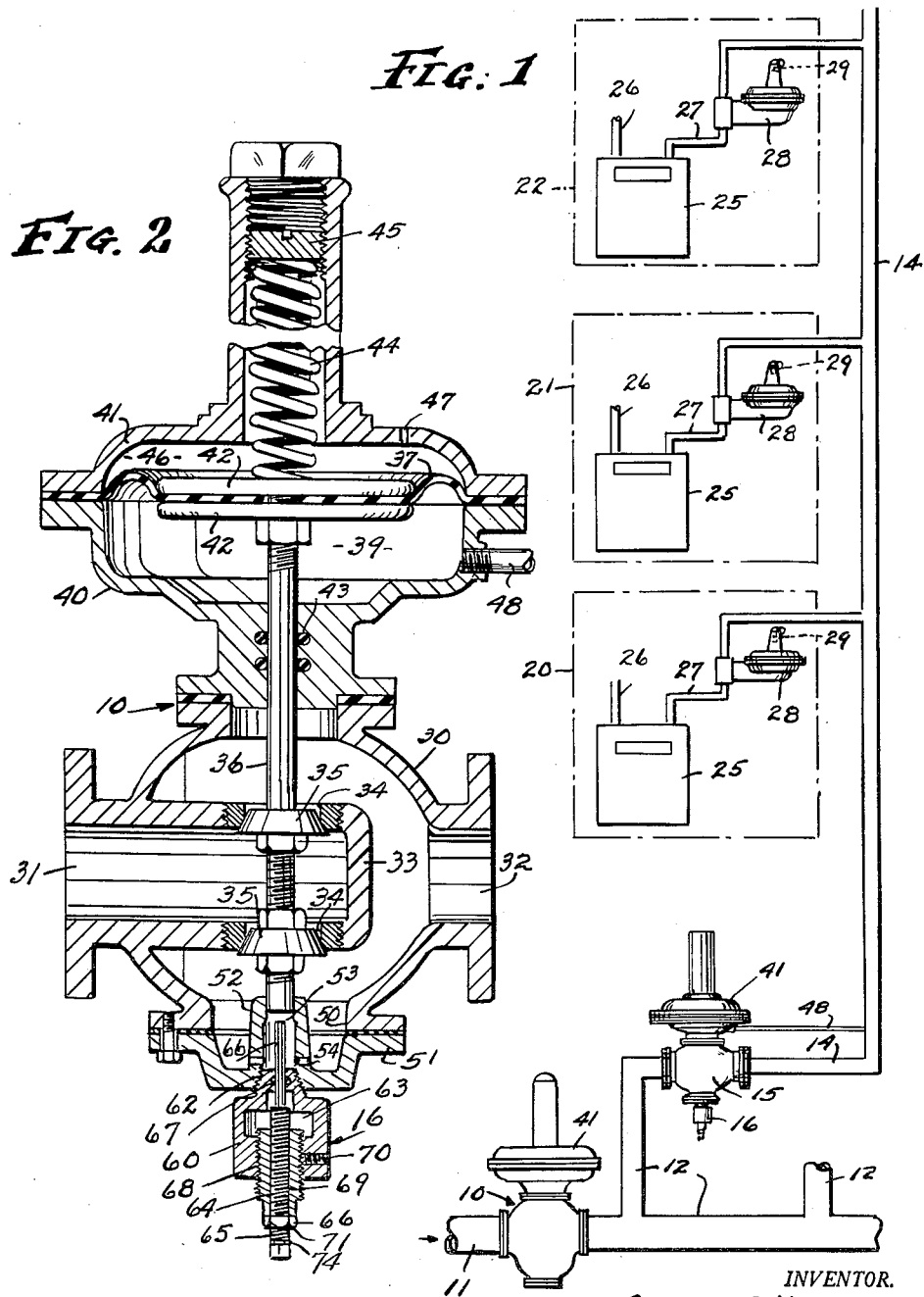

INVENTOR.
GEORGE C. HUGHES
BY
Bates, Teare & McBean
ATTORNEYS

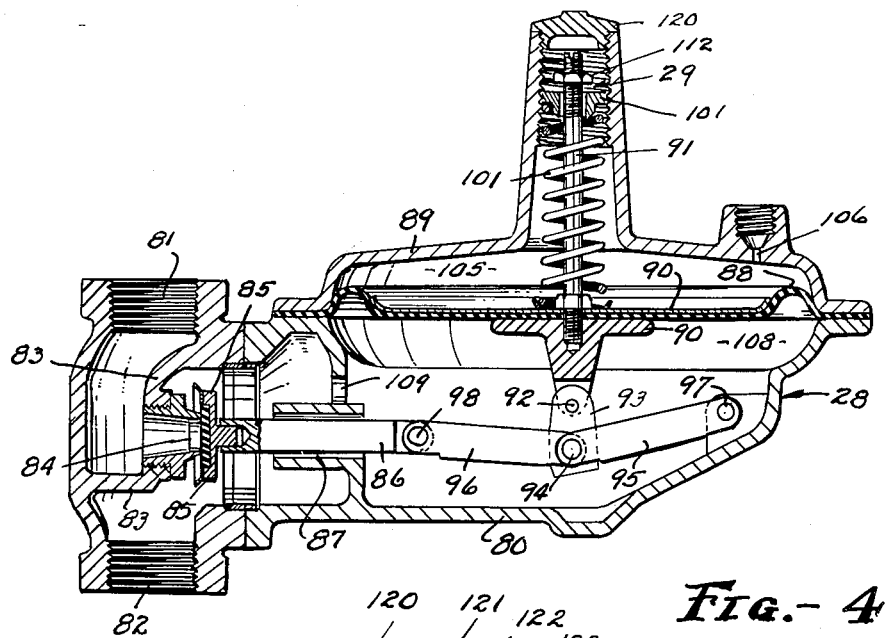

3,023,093
FLUID PRESSURE DISTRIBUTING SYSTEM
George C. Hughes, Anderson, Ind., assignor to Reynolds Gas Regulator Company, Anderson, Ind., a corporation of Indiana
Original application Mar. 25, 1954, Ser. No. 418,613, now Patent No. 2,853,268, dated Sept. 23, 1958. Divided and this application Mar. 14, 1958, Ser. No. 721,479
2 Claims. (Cl. 48—191)

The present invention is concerned with improvements in or relating to fluid distributing systems, and more particularly to a distribution system for regulating and controlling the flow of natural gas and the like. The present application is a division of my co-pending application, Serial No. 418,613, filed March 25, 1954, now Patent No. 2,853,268.

The distribution of natural gas for household and industrial use, presents increasing difficulties. Rapid residential and industrial expansion, in many instances, has increased the pressures required in distribution mains to provide the necessary increase in volume of gas required at customer's installations or service lines. This has made the distribution more dangerous. At times, the supply of gas is limited. In some instances this limitation is such that the addition of gas appliances by existing consumers may result in a serious pressure drop in the supply main, and in other consumer service lines which receive their supply from such supply lines. This likewise increases the hazards encountered in the distribution of the gas. The present invention provides a system of gas distribution which decreases the hazards abovementioned and which eliminates the ill effects to other consumers of a sudden increase in the demand by one consumer.

According to the invention gas is fed from a high pressure main to an intermediate high pressure supply line through a pressure reducing and regulating device which serves to maintain a constant pressure in the intermediate supply line. Gas from the supply line passes to a plurality of consumers service lines through individual pressure regulating devices, each of which acts to further reduce the pressure of the gas and to maintain their respective service line pressures below a predetermined desired maximum. Each of the individual regulating devices includes a limiting device to limit the rate of flow of gas from the supply line to the respective consumer service line. Accordingly, should one consumer increase his demand for gas, as for instance by the addition of gas appliances to his service line, the respective limiting device will restrict the rate of flow to such service line to a predetermined maximum and prevent depletion of the associated supply line pressure.

Other objects and advantages of the invention will become more apparent from the following description of a practical embodiment of the invention illustrated in the accompanying drawings in which:

FIG. 1 is a diagrammatic view of a gas distribution system constructed in accord with the present invention;

FIG. 2 is a centrally located vertical section through one of the pressure regulating devices used in the system;

FIG. 4 is a centrally located vertical section taken through another of the pressure regulating devices used in the system of FIG. 1; and FIG. 5 is an enlarged sectional view of the flow restricting control incorporated in the regulator of FIG. 4.

Figure 3:
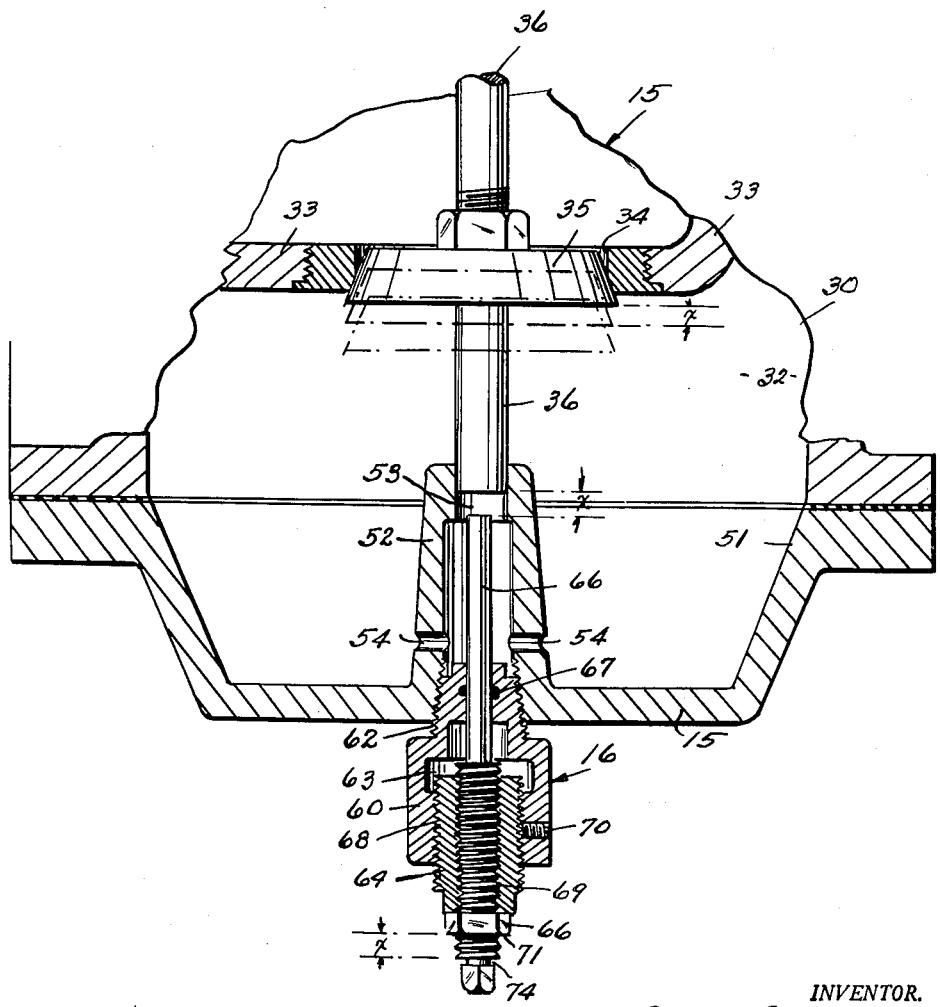
FIG. 3 is an enlarged vertical section of the flow limiting device incorporated in the regulator of FIG. 2, the section being taken in substantially the same plane as that of FIG. 2.

The improved gas distribution system as illustrated in FIG. 1 includes a pressure regulating valve 10 which is disposed between source of gas at high pressure 11, and a high pressure main 12. The high pressure main 12 is connected with a plurality of supply lines 14 through respective pressure regulating and reducing regulators 15, each of which is responsive to the pressure on its outlet side, namely, in its respective supply line 14, and each of which serves to reduce the pressure in the high pressure main to a predetermined pressure in the respective supply line. Each regulator 15 includes a flow restricting device generally indicated at 16 which limits the rate of flow of the gas through the respective regulator so that the maximum volume of gas which may pass through the regulator will be limited to a predetermined number of cubic feet of gas per hour based on a predetermined inlet pressure established by the regulator 10. This volume is determined by the normal maximum demand expected to be required by the consumer installations 20, 21 and 22 which are connected with the respective supply line 14. While only three consumer installations are indicated in the drawings, it is to be understood that this number is merely to facilitate illustration of the invention and that, actually, a far greater number of consumer installations may be supplied by each supply line 14.

Each consumer installation is illustrated as having a meter 25, the outlet of which is connected by a consumer's line 26 with various appliances, not shown, but used by such consumer. The inlet of this meter is connected by a service line 27 with the supply line 14 through the medium of a pressure reducing regulator 28. Each regulator 28 reduces the intermediate pressure in the supply line 14 to the comparatively low pressure desired at the consumer's appliances. These regulators 28 each include a flow restricting device, generally indicated at 29, which restricts the volume of gas that may flow to the respective meter to the maximum normal flow required by the respective consumer.

From the above description it will be seen that, should one consumer add an appliance to his installation which would materially increase the flow of gas required to meet his demand, the service regulators 28 of his installation would limit the rate of flow to that which was normal prior to the installation of the added appliance. While this limiting of the flow could cause a loss of pressure in such consumers service line 27, it nevertheless will not affect the pressure or supply of the other consumer installations receiving their gas from the same supply line 14. This materially reduces the well known hazards which accompany pressure drops in distribution systems.

When the improved system is used and a pressure loss is reported by a consumer to those in charge of distribution, the locus of the cause of such loss is known to be restricted to such consumer's installation. This localization permits rapid determination to the ultimate cause and permits corrective measures to be made with a minimum loss of time. If the pressure loss is due to an added appliance and conditions permit, the consumer's regulator 28 and the supply line regulator 15 may be adjusted to permit a greater flow of gas. For this purpose the limiting devices 16 and 29 are constructed to permit adjustment thereof without interruption of the flow of gas.

Prior to the present invention the reporting of a pressure loss by one consumer merely indicated that there was an abnormal demand somewhere in the system. This required a systematical check of all installations to determine the cause of the pressure drop. Accordingly it will be seen that the use of the present invention reduces the cost of distribution as well as the hazards connected therewith.

The regulators 10 and 15 shown in FIG. 2 each may include a valve body 30 having an inlet 31 adapted to be connected with the source of high pressure 11 or a high pressure main 12, and an outlet 32 adapted to be connected with a high pressure main 12 or service main 14. The inlet and outlet 31 and 32 are separated by a partition wall 33 having a single valve port or opening extending therethrough or, as shown, a pair of aligned ports 34. The flow of fluid through the valve ports 34 is controlled by valve members 35 secured to a common valve stem 36. The position of this stem, as well as that of the valve members relative to their associated ports is under the control of a flexible pressure responsive diaphragm 37 which is stretched across a pressure chamber 39 formed in a diaphragm casing 40 supported at top the body 30. The periphery of the diaphragm 37 is shown as clamped to the casing 40 by a hollow cap 41. The central portion of the diaphragm is clamped between a pair of rigid discs 42 which are secured to the upper end of the valve stem 36. Suitable packing material 43 coacts with the stem 36 and prevents seepage of fluid along the valve stem to and from the pressure chamber 39 below the diaphragm. The diaphragm 37 and the valve members 35 are biased to an open position by a spring 44 interposed between an adjustable stop 45 carried by the cap 41 and the upper face of the top disc 42. The chamber 46 above the diaphragm 37 is vented to atmosphere by a vent opening or port 47. The pressure chamber 39 below the diaphragm 37 is connected by a conduit 48 with the high pressure main 12 or the supply line as the case may be. When the pressure in the main 12 of the line 14 reaches the desired maximum the pressure on the underside of the diaphragm 37 will move the valve members 35 toward their seat permitting only such flow of gas through the valve ports as will maintain the desired pressure in their line 12 at the desired maximum.

As heretofore mentioned the rate of flow of gas through the regulator 15 is limited by the limiting device 16. This device acts to restrict or limit the opening movement of the valve members 35. As shown in FIGS. 2 and 3 the lower end of the valve body 30 has an opening 50 which is closed by closure plate 51. This plate is provided with an internal upwardly extending boss 52 having a vertical opening or guideway 53 axially aligned with the valve stem 36 and into which the lower end of such stem extends. Suitable orifices 54 extending through the boss at the base thereof maintain the pressure in the opening or guideway 53 equal to that of the outlet pressure of the regulator. The lower end of the guideway 53 is closed by the limiting device 16.

The limiting device 16 includes a hollow body 60 secured to the closure plate 51 in axial alignment with the guideway 53, as for instance, by the tapered threaded connection 62. The body 60 has an axial opening 63 extending therethrough. A sleeve 64 is mounted in the lower wall of the body 60 for movement to and from the valve stem 36. A rod 65 is threadingly mounted in the sleeve 64 in axial alignment with the stem 36 and is provided with an upwardly extending portion 66 which projects through the upper wall of the body 60 into the guideway 53. Packing material 67 carried by the body prevents escape of gas or fluid along the rod portion 66.

The threaded connection 68 between the sleeve 64 and the body 60 and the threaded connection 69 between the rod 65 and the sleeve 60 are both straight accurately formed and spaced threads to permit accurate adjustment of the sleeve 64 and the rod 65 relative to the body 60 and each other. The sleeve 64 is normally retained in an adjusted position by a set screw 70 carried by the body 60, while the rod 65 is retained in its adjusted position relative to sleeve 64 by a locknut 66 which engages the bottom face of the sleeve.

Adjustment of the limiting device 16 is accomplished by withdrawing the sleeve 64 a distance sufficient to permit the rod 65 to be moved to a position where a shoulder or other index mark 74 on the rod is flush with the bottom face of the locknut 71 when the latter is substantially in its locking position. The sleeve 64 then is rotated until the upper end of the rod portion 66 abuts the lower face of the valve stem 36 and valves 35 are seated or in their port closing positions. The set screw 70 is then tightened to retain the sleeve in its adjusted position. The rod is then turned, moving it outward away from the valve stem 36 until the end of the rod portion 66 has been lowered a distance equivalent to the desired maximum opening movement of the valve. This distance is equal to the distance between the end of the locknut 71 and the index 74. The desired distance is readily calculated by observing the number of threads between the bottom of the locknut and the index 74 of the rod, which threads as heretofore mentioned are accurately cut and their spacing known.

The maintenance of a constant known pressure in the high pressure main 12 by the regulating device 10, together with the use of a valve orifice having a known area permits calculation of the maximum volume of gas which may pass through the regulator 10 with a predetermined setting of the adjusting rod 74. This enables the limiting device to be set to pass only the normal flow of gas required by the combined consumer installations which are serviced by its respective supply line 14.

The consumer regulators 28 are similar in operation to the regulator 10 heretofore described. Each consumer regulator, as shown in FIGS. 4 and 5, may comprise a housing 80 having an inlet opening 81 and an outlet opening 82 separated by a partition wall 83 having a valve port opening 84. The flow of fluid between the inlet 81 and the outlet 82 is controlled by a valve member 85 carried by a valve stem 86 supported in a guideway 87 formed in the body 80. The position of the valve member 85 is controlled by a flexible diaphragm 88 secured about its perimeter to the perimeter of the housing 80 by a hollow cap 89. The central area of the diaphragm 88 is supported by a pair of rigid discs 90 which are secured together by a vertically extending threaded post 91. The lower disc 90 is pivotally secured, as at 92, to a link 93, the other end of which is pivotally connected with a common pivot 94 of a pair of toggle links 95 and 96. The toggle link 95 is pivoted to the housing 80 as at 97, while the toggle link 96 is pivotally connected as at 98, with the valve stem 86. When the diaphragm 88 moves downward the toggle links serve to move the valve member 85 away from its seat thus opening the port 84. Upward movement of the diaphragm causes the valve member 85 to move towards its seat closing the port 84. The diaphragm 88 is biased toward an open position by a biasing spring 100 mounted within the cap 89 and extending between an adjustable positioning member 101 and the upper diaphragm disc 90. The positioning member 101 is threadily mounted in the upper end of an upstanding hollow boss of the cap 89 and may be adjusted up-and-down to regulate the tension on the spring 100, and accordingly the pressure of the spring against the diaphragm 88.

The chamber 105 above the diaphragm 88 is in communication with atmosphere through a vent 106 in the cap 89. The chamber 108 below the diaphragm 88 is in communication with the outlet passageway 82 of the regulator housing 80 through an orifice 109. When the pressure in the chamber 108, namely the outlet pressure of the regulator, is such that it overcomes the pressure of the spring 100, the valve member 85 is moved toward the port closing position and will pass only that amount of gas required to maintain the desired outlet pressure.

As heretofore mentioned, the service regulators 28 each are provided with a flow limiting device 29 to limit the rate of flow of gas through the regulator. As shown in FIGS. 4 and 5 the upper end of the post 91 is threaded as at 110 and extends freely through an opening 111 in the adjusting member 101. An adjusting nut 112 is positioned on the upper end of the post 110 and coacts with the upper face of the member 101 to limit the downward movement of the post 91 and thereby determine the maximum distance the valve member 85 may be moved away from its port 84.

The upper end of the boss-like portion of the cap 89 extends above the post 91 and is closed by a threaded plug 120. The plug and boss may be provided with external lugs 121 to receive the wire 122 of the usual seal 123.

From the above description it will be seen that the service regulators 28 may readily be adjusted to permit a maximum flow equal to that demanded by the consumer installation. If the demand of the consumer installation should be increased by the addition of appliances or the like the flow restricting device 29 would restrict the opening of the regulator 28 and prevent a pressure drop in the associated service line 14.

It is contemplated that the regulators 10 may likewise be used as service regulators. In some instances it may be desirable that the service regulators be similar to that shown in FIGS. 2 and 3, as the limiting device 16 associated therewith is capable of being adjusted with a much higher degree of precision than those of the regulators 28.

The present application includes claims on the fluid pressure distributing system. Claims to a pressure limiting device as shown in FIGS. 2 and 3 ae set forth in my co-pending application, Serial No. 418,613, filed March 25, 1954, while claims to the pressure limiting device of FIGS. 4 and 5 are set forth in my co-pending application, Serial No. 721,480, filed March 14, 1958, now abandoned.

One of the advantages of the present invention is the fact that the system permits use of regulators which have a much greater flow capacity than is required when the system is originally installed and at the same time reduces the hazards normally present in gas distribution systems. This has several advantages, among which is the ease with which the system may be adjusted to compensate for increases in consumption by existing consumers or by added consumer installations, neither of which require replacement of existing regulators.

I claim:

1. In a system for the distribution of gas to a plurality of individual consumers, a source of high pressure, a high pressure main, pressure regulating means between the source and the high pressure main to maintain pressure in said main at substantially a predetermined maximum, a supply line, a pressure regulating valve connecting said high pressure main with the said supply line and including a reciprocal valve mechanism and coacting valve seat, and manually adjustable means readily accessible on said valve, for controlling the flow of gas through said valve, said valve having a pressure responsive means coupled to said valve mechanism and actuated by the pressure in the supply line, to automatically maintain pressure in the supply line substantially at a predetermined maximum below the pressure in said main, flow restricting means including manually adjustable means readily accessible on said valve and coacting with said valve mechanism for providing for selective adjustment of the maximum rate of flow of gas from said high pressure main to said supply line, said manually adjustable means being immune to the pressures in said supply line and in said main, a plurality of independent consumer installations connected with said supply line, each of said consumer installations including a consumer service line individually connected to said supply line, a second pressure regulating valve interposed between each consumer service line and said supply line and including pressure responsive means controlling the flow of gas through the valve and responsive to the outlet pressure in said second valve, to automatically reduce the gas pressure from the supply line pressure to a predetermined lower maximum consumer pressure, said last mentioned pressure responsive means including manually adjustable means readily accessible on said second valve for providing for selective adjustment of the maximum rate of flow of gas from said supply line to the respective consumer service line and to a rate less than that capable of being supplied by said second valve, said last mentioned manually adjustable means being immune to the pressures in the respective consumer service line and said supply line, each of said manually adjustable means being adjustable without stopping the flow of gas through the system, said system providing for the pinpointing of a pressure loss to the consumer reporting the same, and for readily adjusting the system to compensate for such loss.

2. In a system for the distribution of gas to a plurality of individual consumers, a source of high pressure, a high pressure main, adjustable pressure regulating means between the source and the high pressure main to maintain pressure in said main at substantially a predetermined maximum, a plurality of supply lines, a pressure regulating valve connecting each of said supply lines to said main, each of said valves including a reciprocal valve mechanism and coacting valve seat, and manually adjustable abutment means readily accessible on said valve, for controlling the flow of gas through said valve, each of said valves having pressure responsive means comprising a spring biased pressure responsive diaphragm coating with said valve mechanism and controlled by the pressure in the respective supply line, to automatically maintain the pressure in the respective supply line substantially at a predetermined maximum below the pressure in said main, and flow restricting means including manually adjustable abutment means readily accessible on said regulating valve and coacting with said valve mechanism for providing for selective adjustment of the maximum rate of flow of gas from said high pressure main to the respective supply line, said manually adjustable abutment means being immune to the pressures in said supply line and in said main, a plurality of independent consumer installations connected with each of said supply lines, each of said consumer installations including a consumer service line individually connected to the respective supply line, a second pressure regulating valve interposed between each consumer service line and said supply line, said second valve including pressure responsive means comprising a spring biased pressure responsive diaphragm controlling the flow of gas through the valve and responsive to the outlet pressure in said second valve, to automatically reduce the gas pressure from the supply line pressure to a predetermined lower maximum consumer pressure, said last mentioned pressure responsive means including manually adjustable abutment means readily accessible on said second valve for providing for adjustment of the maximum rate of flow of gas from the respective supply line to the respective consumer service line, and to a rate less than that capable of being supplied by said second valve, said last mentioned manually adjustable abutment means being immune to the pressures in the respective consumer service line and respective supply line, each of said manually adjustable abutment means being adjustable without stopping the flow of gas through the system, said system providing for the pinpointing of a pressure loss to the consumer reporting the same and for ready adjustment of the system to compensate for such loss.

References Cited in the file of this patent

UNITED STATES PATENTS

| | | |
|---|---|---|
| 426,172 | Conroy | Apr. 22, 1890 |
| 1,575,260 | Fisher | Mar. 2, 1926 |
| 1,620,322 | Browne | Mar. 8, 1927 |
| 1,897,517 | Hughes | Feb. 14, 1933 |
| 2,698,226 | Peduzzi | Dec. 28, 1954 |